US010622709B2

(12) United States Patent
Caren et al.

(10) Patent No.: US 10,622,709 B2
(45) Date of Patent: Apr. 14, 2020

(54) COMBINATION EXTERNAL VEHICLE ANTENNA HOUSING AND INSTALLATION METHOD

(71) Applicant: MAGNADYNE CORPORATION, Compton, CA (US)

(72) Inventors: Barry L. Caren, Beverly Hills, CA (US); Mark E. Hockett, Santa Cruz, CA (US); C M Wong, Scarborough (CA); Wentsan Yeh, Torrance, CA (US)

(73) Assignee: MAGNADYNE CORPORATION, Compton, CA (US)

( * ) Notice: Subject to any disclaimer, the term of this patent is extended or adjusted under 35 U.S.C. 154(b) by 94 days.

(21) Appl. No.: 15/943,054

(22) Filed: Apr. 2, 2018

(65) Prior Publication Data

US 2018/0287250 A1 Oct. 4, 2018

Related U.S. Application Data

(60) Provisional application No. 62/480,969, filed on Apr. 3, 2017.

(51) Int. Cl.
*H04W 84/12* (2009.01)
*H04W 88/08* (2009.01)
(Continued)

(52) U.S. Cl.
CPC ............. *H01Q 1/3275* (2013.01); *H01Q 1/42* (2013.01); *H01Q 21/28* (2013.01); *H04B 7/155* (2013.01);
(Continued)

(58) Field of Classification Search
CPC .. H04B 7/14; H04B 7/15507; H04B 7/15514; H04B 3/36; H04B 1/08; H04B 1/082;
(Continued)

(56) References Cited

U.S. PATENT DOCUMENTS

| 6,538,612 B1* | 3/2003 | King | H01Q 1/125 |
| | | | 343/713 |
| 2008/0111752 A1* | 5/2008 | Lindackers | H01Q 1/3275 |
| | | | 343/713 |

(Continued)

OTHER PUBLICATIONS

Website https://kingconnect.com/product/king-jack-antenna/, "KING Jack™ Directional Over-the-Air Antenna with Mount & Built-In Signal Meter (OA8500 & OA8501)", dated Mar. 30, 2016, Retrieved from the internet on Dec. 14, 2018, 2 pgs.

(Continued)

*Primary Examiner* — Philip Sobutka
(74) *Attorney, Agent, or Firm* — Brooks Kushman P.C.

(57) ABSTRACT

An antenna housing facilitates retrofitting a repeater/router and/or an LTE antenna on a vehicle. The combination antenna housing comprises a housing including a base adapted to be assembled to the vehicle, an intermediate portion, and an upper antenna enclosure portion for a radio and television antenna. A method for providing a vehicle with one or more communication links includes the steps of first assembling a plurality of cables within a wall of the vehicle that extend from inside the vehicle to a location on a roof of the vehicle. A radio and television antenna is attached to one or more of the cables within the combination antenna housing. An extra cable is secured inside the housing without electrically connecting the extra cable to another device until after assembly of the vehicle is completed.

18 Claims, 4 Drawing Sheets

(51) Int. Cl.

| | |
|---|---|
| *H04B 1/08* | (2006.01) |
| *H01Q 1/32* | (2006.01) |
| *H04B 7/155* | (2006.01) |
| *H01Q 21/28* | (2006.01) |
| *H01Q 1/42* | (2006.01) |
| *H04W 84/04* | (2009.01) |
| *H04W 84/00* | (2009.01) |

(52) U.S. Cl.
CPC ........ *H04W 84/005* (2013.01); *H04W 84/042* (2013.01); *H04W 84/12* (2013.01)

(58) Field of Classification Search
CPC ............ H04B 2001/084; H04W 88/08; H04W 88/085; H04W 88/04; H04W 88/00; H04W 16/26; H04W 84/10; H04W 84/12; H04W 84/105
USPC ....... 455/3.01, 3.02, 3.04, 3.05, 3.06, 575.9, 455/90.1, 90.3, 345, 346, 347, 348, 349, 455/351
See application file for complete search history.

(56) References Cited

U.S. PATENT DOCUMENTS

| | | | | |
|---|---|---|---|---|
| 2009/0066593 | A1* | 3/2009 | Jared | H01Q 1/1214 343/713 |
| 2010/0150166 | A1* | 6/2010 | Carmel | H04H 20/02 370/437 |
| 2014/0043204 | A1* | 2/2014 | Basnayake | H01Q 1/3275 343/872 |
| 2017/0339124 | A1* | 11/2017 | Karlsson | H04L 45/70 |

OTHER PUBLICATIONS

Website http://www.lavasat.com/en/list_products_27.htm, Copyright © LAVA Electronics. 2012, Retrieved from internet Dec. 10, 2018.
Website http://www.winegard.com/roadstar, RoadStar Omni-Directional VHF UHF Antennas, Wayback Machine Internet Archive date Jan. 21, 2015, Retrieved from internet Dec. 10, 2018, 2 pgs.
Website http://www.winegard.com/rayzarz1, "Amplified HD Digital RV Antenna", Wayback Machine Internet Archive date May 30, 2016, Retrieved from internet on Feb. 2, 2018, 6 pgs.
Website https://www.westmarine.com/satellite-tv-antennas, West Marine, Retrieved from internet on Dec. 17, 2018, 5 pgs. (Prior Art).
Website http://www.antop.com/digital-marine-caravan-tv-antenna, "New Generation Aesthetic Outdoor TV Antenna", Retrieved from internet on Dec. 10, 2018, 2 pgs. (Prior Art).
Website http://magnadyne.com/magnadyne-roof-mount-omni-directional-antenna/, "Magnadyne Roof Mount Omni-Directional Antenna", Wayback Machine Internet Archive date Dec. 1, 2017, Retrieved from internet on Dec. 10, 2018, 2 pgs.
Website http://shakespeare-ce.com/marine/product-category/leisure-products/cellular-wifi-leisure/wifi-amplifiers-leisure/, Shakespeare Marine, Copyright 2016 Jarden Applied Materials, Retrieved from internet on Dec. 10, 2018, 2 pgs. (Prior Art).
Website https://web.archive.org/web/20170707195210/http://www.surecall.com/sig nal-booster/cat/vehicle/ , "Improve Cell Signals for Mobile Vehicles and Boats", Wayback Machine Internet Archive date Jul. 7, 2018, Retrieved from internet on Dec. 10, 2018, 5 pgs.
Website https://web.archive.orglweb/20160925203640/http://Www.winegard.com:80/connect?q=internet, "Winegard Connect, Secure, Simple Mobile Internet Wifi Extender", Wayback Machine Internet Archive date Sep. 25, 2016, Retrieved from internet on Dec. 10, 2018, 4 pgs.
Website https://www.bearifi.com/products/bearextender-outdoor-ip65-certified-water-resistant-usb-wi-fi-extender, "BearExtender Outdoor High Power USB Wi-Fi Extender for Marine/RV (1st gen 2.4 GHz only)", Wayback Machine Internet Archive date Jan. 1, 2018, Retrieved from internet on Dec. 10, 2018, 13 pgs.
Website https://www.cisco.com/c/en/us/td/docs/wireless/antenna/installation/guide/ant1728.html, "Cisco Aironet High Gain Omnidirectional Ceiling Mount Antenna (AIR-ANT1728)", Dated Jun. 29, 2007, Retrieved from intenet on Dec. 10, 2018, 6 pgs.
Website https://www.wifiranger.com/, WifiRanger, Premier RV Intenet Solutions, Wayback Machine Internet Archive date Feb. 20, 2018, Retrieved from internet on Dec. 10, 2018, 15 pgs.
Website https://www.wifiranger.com/oem-distribution2, "WifiRanger Premier Mobile Network", Wayback Machine Internet Archive date 2017, Retrieved from internet on Dec. 10, 2018, 5 pgs.
Website https://mikrotik.com/product/MTAD-5G-30D3-PA, "Mant30 PA", Wayback Machine Internet Archive date Nov. 17, 2018, Retrieved from internet on Dec. 10, 2018, 3 pgs.
Winegard Rayzar z1, Amplified Local HD and Digital Broadcast TV antenna for VHF & UHF digital and HD TV channels, "Installation Guide", Dated Aug. 2017. 4 pgs.
Winegard Connect 2.0, "Installation/Operation Manual", Winegard Company, Dated Oct. 2017, 12 pgs.
Website https://www.weboost.com/products/drive-4gx, "Drive 4G-X 470510", Copyright 2018, Retrieved from internet on Mar. 13, 2018, 8 pgs. (Prior Art).
"Improve Mobile Internet", WifiRanger-Connecting Mobile Lifestyles, Copyright WifiRanger 2010-2018, 9 pgs. (Prior Art).
Website https://kingconnect.com/product/omnipro-omnidirectional-hdtv-air-antenna/, KING OmniPro™ with Mount, Omnidirectional OTA HDTV Antenna (OA1000 & OA1001), Dated Mar. 30, 2016, Retrieved from kingconnect.com on Nov. 26, 2018, 3 pgs.
Website https://kingconnect.com/product/king-omnigo-portable-omnidirectional-ota-hdtv-antenna/, "KING OmniGo™ Portable Omnidirectional OTA HDTV Antenna (OA1501)", Dated Mar. 30, 201, Retrieved from kingconnect.com on Dec. 12, 2018. 2 pgs.

* cited by examiner

COMBINATION EXTERNAL VEHICLE ANTENNA HOUSING AND INSTALLATION METHOD

CROSS REFERENCE TO RELATED APPLICATIONS

This application claims the benefit of U.S. provisional application Ser. No. 62/480,969 filed Apr. 3, 2017, the disclosure of which is hereby incorporated in its entirety by reference herein.

TECHNICAL FIELD

This disclosure relates to external vehicle antenna housings and a method of installing antennas on recreation vehicles, trailers, boats, and trucks having sleeper compartments.

BACKGROUND

Recreation vehicles, trailers, boats, trucks having sleeper compartments are provided with radio and television antennas that receive broadcast signals. The antennas may be mounted on the roof or other exterior location on the vehicle to improve signal reception. Radio and television antennas may be enclosed in an antenna housing. Due to wind resistance, the intermediate mast may be designed to have a narrow cross-section. The top portion of the antenna housing may be an aerodynamically shaped circular housing, a square housing, a wing-shaped housing, or the like.

Wireless routers provide Internet transmissions over a local area network (LAN) that frequently follow a standard known as WiFi. Campgrounds and truck stops may provide LAN routers as a service for customers. Available LAN systems have limited range and the walls of a vehicle substantially reduce the effective range for LAN transmissions that are normally designed to be indoor devices used to connect computers and other internet connected devices.

Long-Term Evolution (LTE) refers to a standard for using high-speed wireless communications for mobile devices and data terminals based upon Global Systems for Mobile Communications/Enhanced Data Rates for GSM (GSM/EDGE) and Universal Mobile Telecommunication System/High Speed Packet Rate (UMTS/HSPA) technologies. Generally, LTE increases capacity and speed of wireless communication for mobile devices.

LTE systems use a different radio interface that are combined with core network improvements made in the fourth generation (4G) cellular networks for data speed improvements. LTE systems are used to improve cellular communications where cell reception is limited. LTE systems include an antenna that may be mounted on the roof of a vehicle for better signal reception and are connected to a booster inside the vehicle that amplifies the signal. However, attaching a separate LTE antenna, LAN antenna, radio antenna and television antenna on a vehicle is undesirable because each installed antenna may require a separate mount, requires additional labor, increases wind resistance, creates a potential water leak path, and is visually objectionable.

Vehicle manufacturers attach and connect cables to radio and television antennas mounted on the vehicle at a factory when the walls and ceiling are accessible because nearly all vehicles are provided with a radio and a television. LAN and LTE devices are not pre-installed because the added cost of the antennas or LAN router or LTE booster is not warranted if the customer does not require LAN or LTE reception. But for customers who want improved reception, adding LAN and LTE antennas after the vehicle is manufactured increase costs due to the need to disassemble walls and ceiling panels to run wiring or cables from a wall receptacle to the roof mounted antennas.

When cables are routed through the roof or walls of a vehicle, generally a hole is cut in the roof or wall and the cable is pulled through the hole into a base of the antenna mount. Caulking or on another type of sealant is applied around the base. If there are any gaps in the caulking or a crack develops in the caulking, water may leak into the hole in the roof or wall and may cause interior damage.

This disclosure is directed to solving the above problems and other problems as summarized below.

SUMMARY

The disclosed method and apparatus solve the above problems by providing a combination antenna housing as original equipment on a vehicle that includes a detachably connected intermediate housing portion that facilitates retrofitting a router/repeater including an antenna and/or an LTE antenna into the combination antenna housing. The detachably connected intermediate housing portion may be attached with threaded fasteners, connected by a hinge, threaded connection, bayonet mount, or the like. As used herein, the terms "detachably connect" or "detachably connected" should be construed to mean to be connected in such a way as to be partially or fully separable and includes alternative arrangements to the disclosed fasteners such as a hinge, mating threaded portions, a bayonet mount, latches, or the like that permit accessing the interior of the housing to install an antenna or a repeater/router.

According to one aspect of this disclosure, a combination antenna apparatus is disclosed that is assembled to a roof or other exterior location on a vehicle. The combination antenna housing comprises a base adapted to be attached to the roof or another exterior location on the vehicle, a housing detachably connected to the base that defines an enclosed space, a seat, or a receptacle, for a repeater/router including a LAN antenna (hereinafter referred to as a "repeater/router"). The base defines an area adapted to securely receive the repeater/router within the enclosed space.

The repeater/router may be adapted to communicate wirelessly or through a cable with a second rebroadcasting repeater/router (hereinafter referred to as a "rebroadcaster") inside the vehicle. The repeater/router may communicate with the rebroadcaster, for example, by sharing the 2.4 gHz frequency that is used for connecting with the host. Alternatively, a passive antenna may be installed within the enclosed space to provide enhanced reception to LAN enabled devices inside the vehicle. The passive antenna may include an outer portion in close proximity to the repeater/router to pick up signals from the repeater/router and transfer the signals picked up from the repeater/router to an inside portion of the passive antenna. A radio antenna and a television antenna may also be enclosed within the housing.

The base may include an outer flange adapted to be attached to the vehicle with fasteners, either directly or with a bracket, and a raised ring inside the outer flange. The raised ring may define a cavity inside the raised ring and also may inhibit any water from entering the cavity. The cavity may be cup-shaped and may also define a pocket or receptacle for receiving the repeater/router and securing the repeater/router inside the enclosed space. A conduit may be provided that may extend as much as several inches above the cavity and the raised ring and into the enclosed space. Cables are routed through the opening in the conduit that is spaced above the roof or other mounting surface and then is connected to the repeater/router and at least one antenna. The combination antenna apparatus may further comprise an O-ring or other type of seal that is assembled to the raised ring that establishes a seal around the cavity.

The housing may include a lower surface that includes a rib that engages the O-ring or seal when the housing is attached to the base. The rib engages the O-ring or seal when the housing is attached to the base. A plurality of fasteners may be inserted into a plurality of internally threaded receptacles secured to the base to detachably connect the intermediate housing to the base. Seals may also be provided around the fasteners.

The repeater/router may be enclosed within the interior space, and the rebroadcaster may be disposed inside the vehicle and may be wirelessly connected to the LAN antenna. Alternatively, the repeater/router may be enclosed within the interior space, and the rebroadcaster may be disposed inside the vehicle and may be connected by a cable, for example an ethernet cable, to the repeater/router.

The combination antenna apparatus may further comprise an LTE antenna secured within the intermediate housing and connected through a cable to an LTE booster disposed inside the vehicle. LTE as referred to in this application should be construed to comprise cellular data and voice communication systems.

The combination antenna apparatus may further comprise a wiring conduit that extends through the base and into the intermediate housing in an elevated relationship to the base, wherein cables are routed through the wiring conduit from inside the vehicle for connection to a plurality of antennas inside the housing. The LTE antenna may be attached to the roof by securing the LTE antenna to the wiring conduit.

According to another aspect of this disclosure, a method is disclosed for providing a vehicle with one or more communication links. The method includes the steps of first assembling a plurality of cables or wires within a wall of the vehicle that extend from inside the vehicle to an exterior location on the vehicle. Next, an antenna is attached to one of the cables and the antenna is provided within a housing assembled to the vehicle. A second one of the cables is secured inside the housing without electrically connecting the second cable to another apparatus after which assembly of the vehicle is completed.

The plurality of cables may be of different types. For example, a coaxial cable may be provided for a television, another coaxial cable may be provided for an AM/FM radio, an ethernet cable may be provided for LAN signals, and a power wire may be provided to provide power to a repeater/router. The ethernet cable may include a power over ethernet (POE) wire instead of using a separate power wire.

The housing may have at least two portions and the method may further comprise opening the housing by fully or partially separating the at least two portions of the housing after completing assembly of the vehicle. A repeater/router may be assembled inside the housing and the second one of the cables may be attached to the repeater/router. A rebroadcaster may be provided that is operatively connected to the repeater/router by, for example an ethernet cable or by a wireless link.

The rebroadcaster may be disposed within the vehicle or within the housing.

A third cable may be connected to an LTE antenna after the housing is opened and after completing assembly of the vehicle. The third cable may be connected between the LTE antenna and an LTE booster.

According to another aspect of this disclosure, a LAN system is disclosed for vehicles such as recreational vehicles, trailer, boats, and sleeper cabs. The LAN system comprises an access point router that sends and receives LAN signals. A housing is provided that is adapted to be attached to a vehicle, either directly or with a bracket, that houses a television antenna, a radio antenna, and a repeater/router that sends and receives LAN signals between the access point and the repeater/router. The housing includes a base attached to the vehicle and an enclosure portion that is detachably connected to the base. A LAN enabled device may be used to send and receive LAN signals between the LAN enabled device and the access point, or send and receive secondary LAN signals between the LAN enabled device and the repeater/router disposed in the housing or the rebroadcaster inside the vehicle.

According to other aspects of the LAN system, the system may further comprise a rebroadcaster disposed inside the vehicle that is adapted to send and receive secondary LAN signals from the repeater/router in the housing. The LAN enabled device is adapted to communicate with the rebroadcaster.

The secondary LAN signals from the repeater/router in the housing may be transmitted through a cable extending between the receiver/router and the rebroadcaster.

The cable may be installed in the vehicle when the vehicle is assembled, and the enclosure portion may be removed from the base to install the repeater/router on the base as a retrofit with the enclosure portion being reattached to the base after the repeater/router is installed.

A passive antenna may be provided that includes an outer portion disposed inside the combination antenna housing and an inner portion disposed inside the vehicle. The outer portion of the passive antenna is placed close to the antennas of the repeater/router to capture bleed-over EMF that is passively transmitted through the passive antenna to the inner portion inside the vehicle. LAN enabled devices inside the vehicle can then link to the repeater/router through the passive antenna. The passive antenna provides sufficient signal quality for devise such as laptops, phones, tablets, and the like to function with improved range even if a rebroadcaster is not provided inside the vehicle.

According to another aspect of this disclosure, a long-term evolution (LTE) system is provided that comprises a cellular system that sends and receives mobile phone/cell phone data signals. A housing is adapted to be attached to a vehicle that encloses a television antenna, a radio antenna, and an LTE antenna for receiving mobile phone/cell phone data signals. The housing includes a base attached to the vehicle and an enclosure portion that is detachably connected to the base. A mobile phone/cell phone data signal booster is disposed inside the vehicle and connected to the LTE antenna. The mobile phone/cell phone data signal booster is adapted to send and receive secondary mobile phone/cell phone data signals between the mobile phone signal/cell phone data signal booster and a cell phone.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
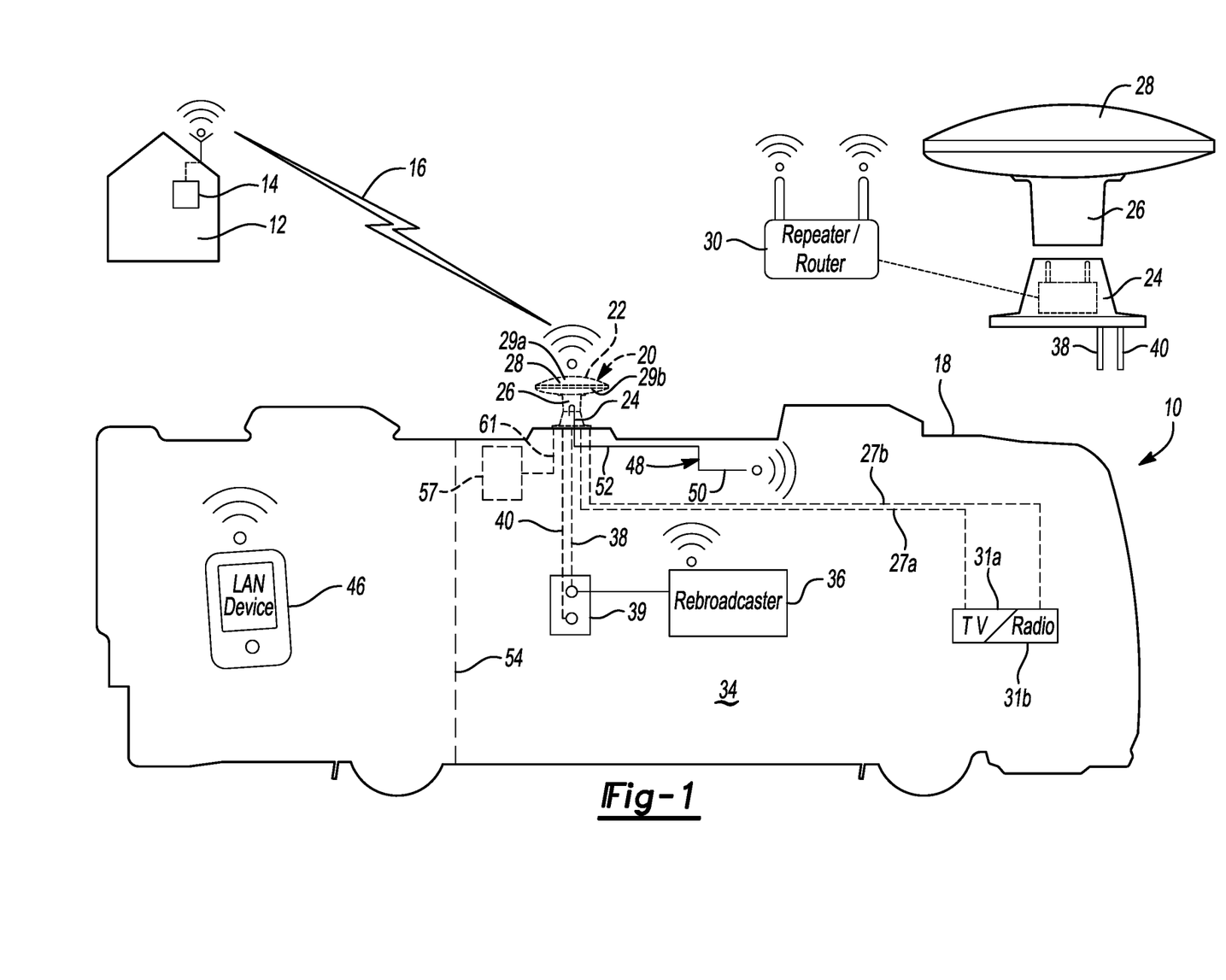
FIG. 1 is a diagrammatic view of a recreational vehicle including a LAN system made in accordance with one embodiment of this disclosure.

Referring to FIG. 1, a recreation vehicle 10 is shown that is within range of a base station 12 through an access point router 14. Local Area Network (LAN) signals 16 are transmitted between the access point router 14 and the recreation vehicle 10. While a recreation vehicle is illustrated in FIG. 1, this disclosure is also applicable to truck sleeper cabins, boats, or camping trailers.

Figure 2:
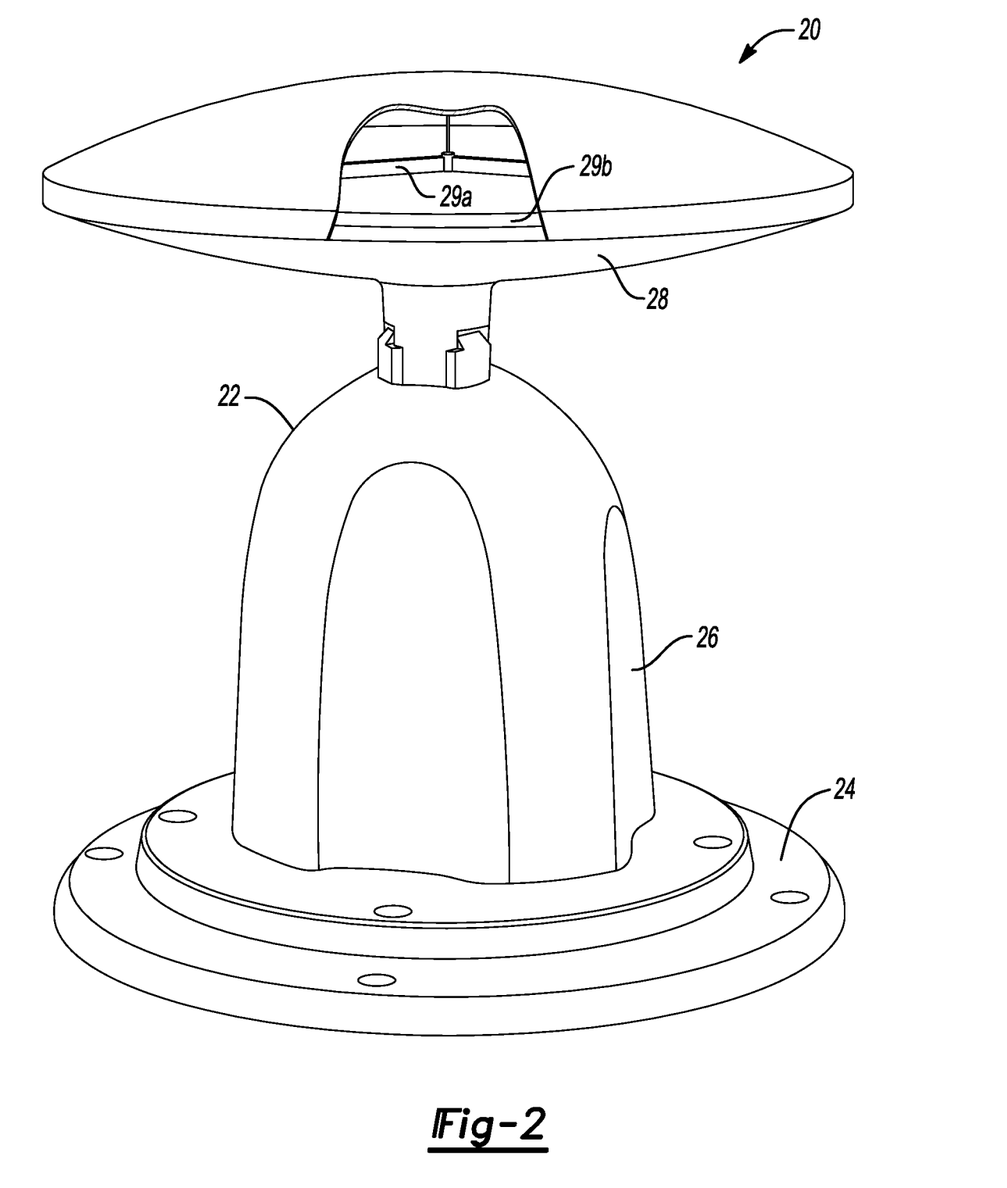
FIG. 2 is a perspective view of a combination antenna apparatus made in accordance with one embodiment of this disclosure.
Figure 3:
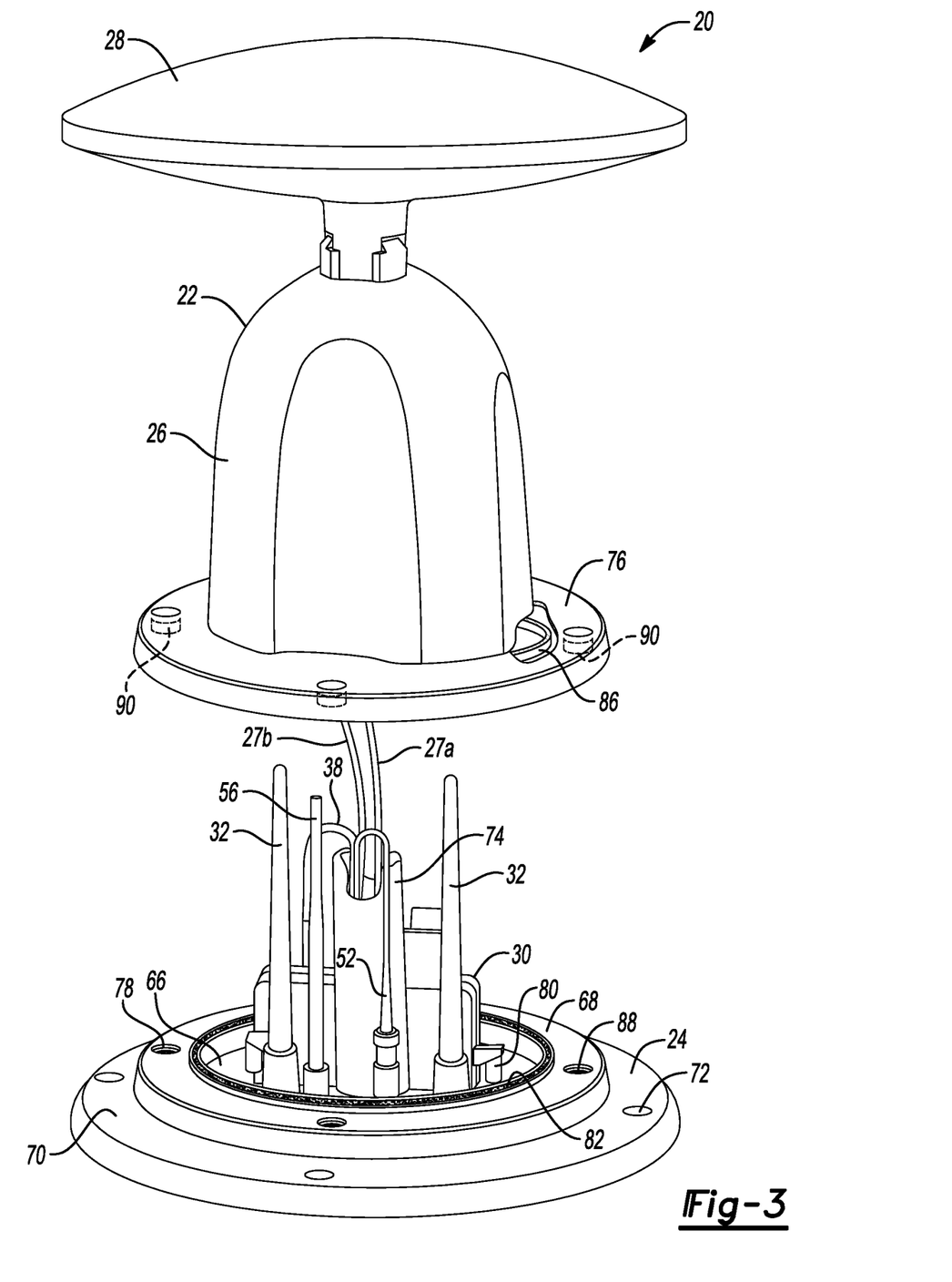
FIG. 3 is an exploded perspective view of the combination antenna apparatus shown in FIG. 2.
Figure 4:
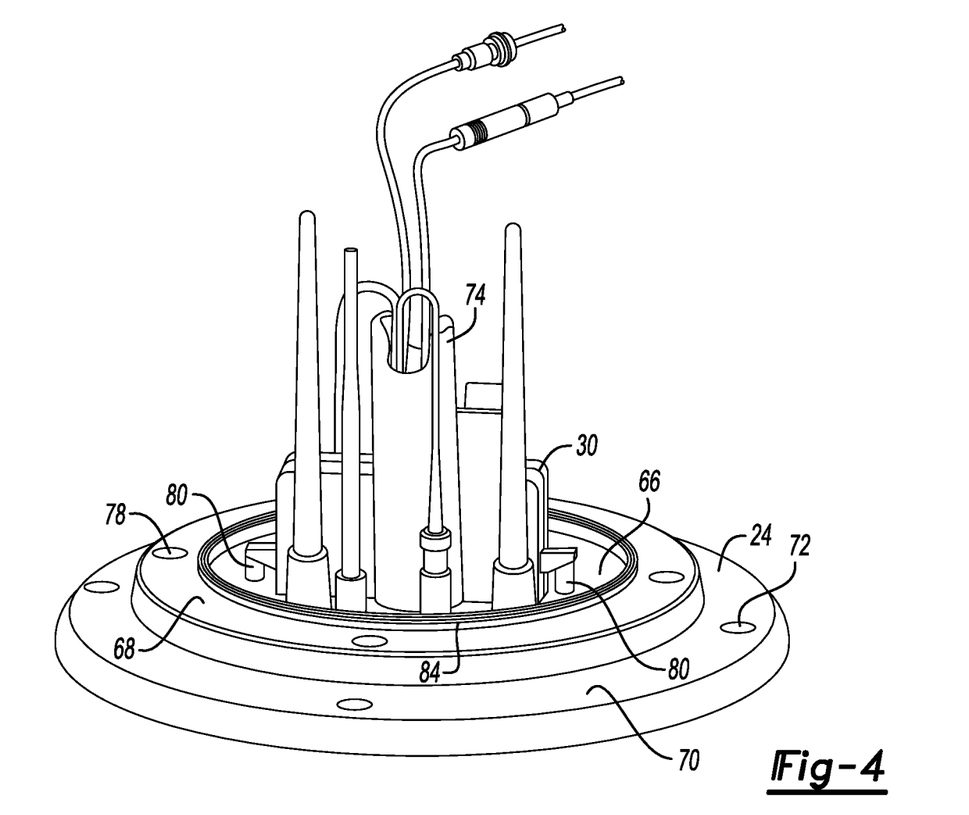
FIG. 4 is a perspective view of a base portion of the antenna housing with a repeater/router an LTE antenna and a passive LAN antenna.

Referring to FIGS. 1 and 2, the recreation vehicle 10 includes a roof 18 upon which a combination antenna apparatus generally indicated by reference numeral 20 is mounted. In the illustrated embodiment, the combination antenna apparatus 20 is mounted directly on the roof but it should be understood that the apparatus could be mounted on a bracket attached to the roof or at another exterior location on the vehicle. The combination antenna apparatus 20 includes a housing 22 that encloses a plurality of antennas as shown in FIGS. 3 and 4. The housing 22 includes a base 24, an intermediate portion 26, and a top portion 28. A television antenna 29a and a radio antenna 29b is provided in the top portion 28 of the housing 22 and is connected by a cable 27a and 27b, respectively, wiring or cables to a television 31a and radio 31b inside the recreational vehicle 10. The intermediate portion 26 and top portion 28 are separable in the illustrated embodiment but may also be combined into a single part. The base 24 is adapted to be attached to the roof 18 of the recreation vehicle 10 with fasteners and is caulked or otherwise sealed to prevent any water from leaking into the recreation vehicle 10 from around the base 24.

Referring to FIGS. 1 and 3, the intermediate portion 26 of the housing 22 is separated from the base 24 to illustrate the base 24 with a repeater/router 30 seated on the base 24. A pair of repeater/router antennas 32 are part of the exterior repeater/router antenna 32 and function to send and receive LAN signals 16 to and from the access point router 14. The intermediate portion 26 is configured to cooperatively engage the base 24. In the illustrated embodiment, the intermediate portion 26 is detachably connected by four bolts to the base 24. Other types of detachable connectors such as a hinge, cooperating threaded portions, a bayonet connector, or the like are to be understood to detachably connect the intermediate housing to the base. The detachable connectors may be used to provide access for installing antennas or a repeater/router 30 in the enclosed space above the base 24 inside the intermediate housing 26.

The recreation vehicle has walls 34 (shown in FIG. 1) that block reception of LAN signals from the access point router 14. The combination antenna apparatus 20 mounted on the roof 18 or on another exterior location on the vehicle is better positioned to send and receive LAN signals 16 from the access point router 14. The repeater/router 30 repeats or retransmits the LAN signals 16 wirelessly to rebroadcaster 36 inside the vehicle 10. Alternatively, the rebroadcaster 36 may be connected by a cable 38, such as a ethernet cable, through the walls 34 or roof 18 to the exterior repeater/router 30. A power supply 39 may be connected by a power supply wire 40 for the exterior repeater/router 30. The power supply wire 40 may be a separate wire or may be a power over ethernet cable (COE). The wire 40 or cable is installed inside the walls 34 and roof 18 of the of the recreation vehicle 10 along with other wires or cables (not shown) when the recreation vehicle is built in the factory prior to when the inner wall panels are installed.

According to the method disclosed, coaxial cables for an entertainment system 31 a and 31b including a television and/or radio are normally installed when the recreation vehicle is assembled at the factory because they are almost universally required by purchasers. Internet and LTE services are less frequently required and are normally installed as aftermarket equipment. However, this disclosure solves the problems relating to retrofitting repeater/routers and LTE antennas on vehicles after manufacturing by preinstalling the wires or cables 38, 40 in the walls 34 and roof 18 and securing the outside ends thereof to the antenna housing 22. If an exterior router/repeater 30 and/or or an LTE antenna 48 are desired by the purchaser, they may be easily installed by opening the housing 22, attaching the devices, and closing the housing 22 to re-establish an effective seal between the intermediate portion 26 and the base 24.

A LAN enabled device 46 (shown in FIG. 1) may connect to the access point router 14 through the rebroadcaster 36, a passive LAN antenna 48, or the exterior repeater/router 30. The passive LAN antenna 48 includes an inner portion 50 that extends into the recreation vehicle. An outer portion 52 of the passive LAN antenna 48 is disposed outside the vehicle and is passively connected to the repeater/router 30. The recreation vehicle 10 may have interior walls 54 through which LAN signals 16 may be retransmitted by the rebroadcaster 36, a passive LAN antenna 48, or the exterior repeater/router 30 and received by the LAN enabled device 46.

An LTE antenna 56 may be provided inside the housing 22 to improve cell phone communications in areas where cell phone signals are weak and reception is not reliable. The LTE antenna 56 may be attached to a receptacle in the base 24 or may be attached with a zip-tie to part of the housing 22. The LTE antenna is connected by a cable 61 to a booster 57 mounted inside the vehicle 10 to boost the signal that is transmitted through an inside antenna as a mobile phone or cell phone data signal.

Figure 5:
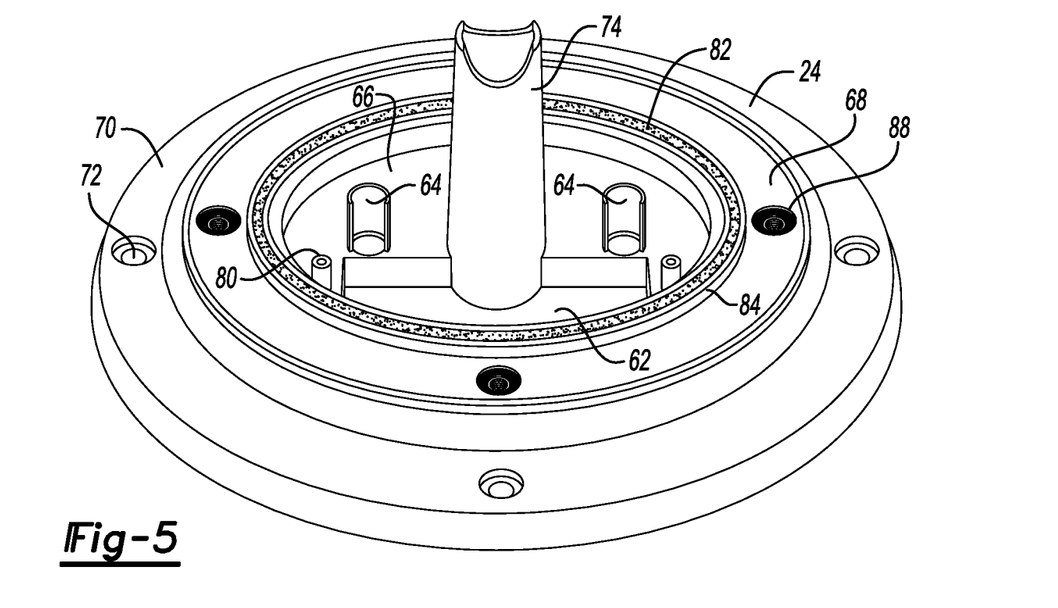
FIG. 5 is a perspective view of a base portion of the antenna housing.

Referring to FIGS. 3-5, the base 24 includes a repeater/router receptacle 62. The receptacle 62 may be a cavity defined by the base 24 and intermediate housing 26 that is adapted to receive a repeater/router 30 or may alternatively be an area, seat, or receptacle for a repeater/router 30. The repeater/router 30 or antenna may be secured by a zip tie, screws, or other types of fasteners to the base 24 that are capable of securely holding the device 30 within the combination antenna apparatus 20. As illustrated in FIG. 5, a rectangular receptacle 62 is integrally formed in the base 24 with sides that are configured to restrain movement of the repeater/router 30. Bosses 63 may be integrally molded, or otherwise provided on the base 24 for receiving screws. The repeater/router 30 may be securely fastened to the base 24 by attachment bosses 63. Router antenna receptacles 64 may also be provided to further secure the repeater/router 30 to the base 24.

The base 24 is constructed to prevent water leakage into the housing 22. The base 24 includes a central portion 66 that may receive the repeater/router 30 and/or the LTE antenna 56 that are installed after the vehicle 10 is assembled. A raised inner ring 68 extends around the central portion 66. In the illustrated embodiment, the ring 68 is circular but may also be provided in a different shape. The ring 68 is continuous to inhibit any water that could possibly seep between the base 24 and the intermediate portion 26 from reaching the central portion 66 where it could damage the repeater/router 30.

A base mounting flange 70 extends outwardly from the raised inner ring 68 and defines a plurality of fastener holes 72. A conduit 74 is provided in the central portion 66 that extends from the base 24 and into the intermediate portion 26 of the housing 22. The conduit 74 may be up to several inches in height and is intended to function to prevent water from flowing over the base 24 and entering the opening in the base 24 where the wires or cables 38, 40 enter the housing 22. An intermediate housing flange 76 extends outwardly from the intermediate portion 26 of the housing 22 and is substantially parallel to the base mounting flange 70. The intermediate housing flange 76 defines a plurality of fastener receiving holes 78 corresponding to the location of the fastener holes 88 defined by the raised ring 68.

An O-ring seal 82 is fitted into an O-ring channel 84 defined by two upstanding, flanges that extend toward the intermediate housing flange 76. A rib 86 is provided on the intermediate housing flange 76 to engage the O-ring seal 82 when the intermediate housing 26 is secured to the base 24. The O-ring seal 82 is compressed by the rib 86 inside the O-ring channel 84 to tightly seal the intermediate portion 26 to the base 24.

A plurality of fastener seals 88 are provided within the fastener holes 78 that cooperate with a corresponding plurality of small circular ribs 90 that are oriented to form a seal around the fasteners that are used to secure the intermediate portion 26 to the base 24. The fastener seals 88 prevent water from leaking into the area below the base 24. The fastener seals 88 may be co-molded with the base or otherwise assembled in to the fastener holes 78.

The method of providing a vehicle 10 with one or more communication antennas for an entertainment system, internet repeater/router, and/or LTE antenna and booster comprises a first step of assembling a plurality of cables or wires (e.g. 27a, 27b, 38, 40) within a wall 34 of the vehicle that extend from inside the vehicle 10 to the combination antenna apparatus 20 on a roof 18 or other exterior location on the vehicle 10. A first antenna for television or radio signals is attached to a first one of the cables and is provided within a housing assembled to the roof of the vehicle. An "extra" or second one of the cables or wires is secured inside the housing 22 without electrically connecting the second one of the cables to another apparatus in the housing 22 and subsequently completing assembly of the vehicle 10. Additional "extra" cables may be run to the housing 22 and left unconnected.

The housing 22 may have at least two portions, and the method may include the additional steps of opening the housing 22 by partially or fully separating the intermediate portion 26 from the base 24 of the housing 22 after completing assembly of the vehicle 10. Next, a repeater/router 30 is assembled inside the housing 22 and the second one of the cables, such as a power wire and/or signal cable, is assembled to the repeater/router 30 to provide power to the repeater/router 30. The rebroadcaster 36 disposed in the vehicle may be operatively connected to the repeater/router 30 by a wireless or wired connection.

At least one or more "extra" wires or cables may be connected to the housing before completing assembly of the vehicle. For example, a third cable may be provided that can later be connected between a LTE antenna and an LTE booster. The third cable is connected to the LTE antenna after the housing is opened and after completing assembly of the vehicle 10. The LTE booster is installed inside the vehicle and is connected by the cable to the LTE antenna. The LTE booster receives mobile phone signal or cell phone data signals from a cellular network and repeats the signal inside the vehicle by sending and receiving secondary mobile phone signals or cell phone data signals with a cellphone inside the vehicle.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A combination antenna apparatus assembled to an exterior location on a vehicle comprising:
    a base attached to the exterior location; and
    a housing detachably connected to the base, wherein the housing defines an enclosed area above the base that is adapted to receive a repeater/router, wherein the base includes an outer flange adapted to be attached to the exterior location with fasteners, a raised ring inside the outer flange, wherein the raised ring defines a cup-shaped cavity inside the raised ring and below the enclosed area.

2. The combination antenna apparatus of claim 1 wherein the housing includes an upper antenna enclosure portion provided above the enclosed area that is adapted to receive the repeater/router and further comprising:
    a radio/television antenna enclosed within the upper antenna enclosure portion.

3. The combination antenna apparatus of claim 1 and wherein the repeater/router is adapted to communicate with a rebroadcaster at a location within the vehicle.

4. The combination antenna apparatus of claim 1 and a conduit extending into the cup-shaped cavity and above the raised ring, wherein cables are routed through the conduit for connection to a plurality of antennas inside the combination antenna apparatus.

5. The combination antenna apparatus of claim 1 further comprising:
    seal assembled to the raised ring that seals around the cup-shaped cavity.

6. The combination antenna apparatus of claim 5 wherein the housing includes a lower surface that has a rib that engages the seal when the housing is attached to the base, and wherein the rib engages the seal when the housing is detachably connected to the base.

7. The combination antenna apparatus of claim 1 wherein the repeater/router is enclosed within the housing, and wherein a rebroadcaster is disposed outside of the combination antenna apparatus and is wirelessly connected to the repeater/router.

8. The combination antenna apparatus of claim 1 wherein the repeater/router is enclosed within the housing, and wherein a rebroadcaster is disposed outside of the combination antenna apparatus and is connected by a cable to a LAN antenna.

9. The combination antenna apparatus of claim 1 further comprising:
an LTE antenna disposed within the housing and connected through a cable to an LTE booster disposed inside the vehicle.

10. The combination antenna apparatus of claim 9 wherein the exterior location is a roof of the vehicle and an LTE antenna is attached to the roof by attaching the LTE antenna to a conduit extending into the cup-shaped cavity, wherein cables are routed through the conduit for connection to a plurality of antennas inside the combination antenna apparatus.

11. A method of providing a vehicle with one or more communication links comprising:
assembling a plurality of cables within a wall of the vehicle that extend from inside the vehicle to an exterior location on the vehicle;
attaching a first antenna to a first one of the cables, wherein the first antenna is provided within a housing having at least two portions, wherein the housing is assembled to the exterior location on the vehicle;
providing a second one of the cables inside the housing without electrically connecting the second one of the cables to another apparatus in the housing;
completing assembly of the vehicle;
opening the housing by at least partially separating the at least two portions of the housing after completing assembly of the vehicle;
assembling a repeater/router inside the housing and attaching the second one of the cables to the repeater/router to provide power to the repeater/router; and
providing a rebroadcaster that receives signals from the repeater/router and retransmits the signal.

12. The method of claim 11 wherein the rebroadcaster is disposed within the vehicle.

13. The method of claim 11 wherein a third one of the cables is connected between a LTE antenna and an LTE booster, wherein the third cable is connected to the LTE antenna after the housing is opened and after completing assembly of the vehicle.

14. A method of providing a vehicle with one or more communication links comprising:
after assembly of a vehicle which includes a plurality of cables within a wall of the vehicle that extend from inside the vehicle to an exterior location on the vehicle, wherein a first antenna is attached to a first one of the cables, wherein the first antenna is provided within a housing having at least two portions separated by an O-ring seal, wherein the housing is assembled to the exterior location on the vehicle, wherein a second one of the cables is located within the wall adjacent to the housing without electrically connecting the second one of the cables to another apparatus in the housing, after the assembly of the vehicle directing the following steps in the order provided:
opening the housing by at least partially separating the at least two portions of the housing after completing assembly of the vehicle;
assembling a repeater/router inside the housing and attaching the second one of the cables to the repeater/router to provide power to the repeater/router; and
providing a rebroadcaster within an interior of the vehicle that receives signals from the repeater/router and retransmits the signal.

15. A combination antenna apparatus assembled to an exterior location on a vehicle comprising:
a base constructed to be attached to the exterior location of the vehicle;
a housing detachably connected to the base through use of fasteners, wherein the housing defines an enclosed area above the base, said base is adapted to receive a LAN antenna within the enclosed area capable of communicating with at least one device that includes a second LAN antenna positioned at an interior location of the vehicle, said base includes a receptacle for receiving a LTE antenna within the enclosed area, the base also includes a receptacle for receiving a repeater/router within the enclosed area, wherein the base includes an outer flange outside of the enclosed area adapted to be attached to the exterior location with fasteners, a raised ring inside the outer flange, wherein the raised ring defines a cup-shaped cavity;
an o-ring seal disposed within an o-ring channel and between the raised ring of the base and the housing for selectively sealing the enclosed area; and
a television antenna located within the enclosed area and attached to the housing above the receptacle for the repeater/router and the receptacle for the LTE antenna.

16. The combination antenna apparatus of claim 15, where the LAN antenna for use in the combination antenna apparatus is capable of wi-fi formatted wireless communication.

17. An antenna apparatus for a vehicle comprising:
a base including an outer flange attached to an exterior location of a vehicle with fasteners and a sealant, the base also including a raised ring inside the outer flange, wherein the raised ring defines a cup-shaped cavity; said base includes a receptacle receiving a LAN antenna capable of wi-fi formatted wireless communication, the base also includes a receptacle receiving a LTE antenna;
a housing detachably connected to the base through use of fasteners, wherein the housing and the base combine to define a sheltered area outside of the vehicle;
a television antenna located within the sheltered area and attached to the housing above the LAN antenna and the LTE antenna;
a passage extending from the sheltered area through the base and adapted to extend inside an exterior surface of the vehicle;
wherein the LAN antenna is adapted to communicate with an access point router of a base station outside of the vehicle, the LAN antenna is connected by a wire to at least one device inside of the vehicle that includes a LAN antenna, the wire extending through the passage; and
an O-ring seal disposed within an O-ring channel and between the raised ring of the base and the housing that selectively seals the sheltered area and the passage from environmental elements outside of the vehicle.

18. The antenna apparatus of claim 17, wherein the LTE antenna is adapted to communicate via a wireless cellular signal and the LTE antenna is also wired to at least one device inside of the vehicle that includes a LAN antenna via a wire extending through the passage.

* * * * *

(12) EX PARTE REEXAMINATION CERTIFICATE (12013th)
United States Patent
Caren et al.

(10) Number: US 10,622,709 C1
(45) Certificate Issued: Mar. 15, 2022

(54) COMBINATION EXTERNAL VEHICLE ANTENNA HOUSING AND INSTALLATION METHOD

(71) Applicant: MAGNADYNE CORPORATION, Compton, CA (US)

(72) Inventors: Barry L. Caren, Beverly Hills, CA (US); Mark E. Hockett, Santa Cruz, CA (US); C M Wong, Scarborough (CA); Wentsan Yeh, Torrance, CA (US)

(73) Assignee: MAGNADYNE CORPORATION, Compton, CA (US)

Reexamination Request:
No. 90/014,683, Feb. 22, 2021

Reexamination Certificate for:
Patent No.: 10,622,709
Issued: Apr. 14, 2020
Appl. No.: 15/943,054
Filed: Apr. 2, 2018

Related U.S. Application Data

(60) Provisional application No. 62/480,969, filed on Apr. 3, 2017.

(51) Int. Cl.
*H04W 84/12* (2009.01)
*H04W 88/08* (2009.01)
*G06F 21/56* (2013.01)
*H01Q 21/28* (2006.01)
*H01Q 1/32* (2006.01)
*H01Q 1/42* (2006.01)
*H04B 7/155* (2006.01)

(52) U.S. Cl.
CPC ......... *G06F 21/562* (2013.01); *H01Q 1/3275* (2013.01); *H01Q 1/42* (2013.01); *H01Q 21/28* (2013.01); *H04B 7/155* (2013.01)

(58) Field of Classification Search
None
See application file for complete search history.

(56) References Cited

To view the complete listing of prior art documents cited during the proceeding for Reexamination Control Number 90/014,683, please refer to the USPTO's public Patent Application Information Retrieval (PAIR) system under the Display References tab.

*Primary Examiner* — John M Hotaling

(57) ABSTRACT

An antenna housing facilitates retrofitting a repeater/router and/or an LTE antenna on a vehicle. The combination antenna housing comprises a housing including a base adapted to be assembled to the vehicle, an intermediate portion, and an upper antenna enclosure portion for a radio and television antenna. A method for providing a vehicle with one or more communication links includes the steps of first assembling a plurality of cables within a wall of the vehicle that extend from inside the vehicle to a location on a roof of the vehicle. A radio and television antenna is attached to one or more of the cables within the combination antenna housing. An extra cable is secured inside the housing without electrically connecting the extra cable to another device until after assembly of the vehicle is completed.

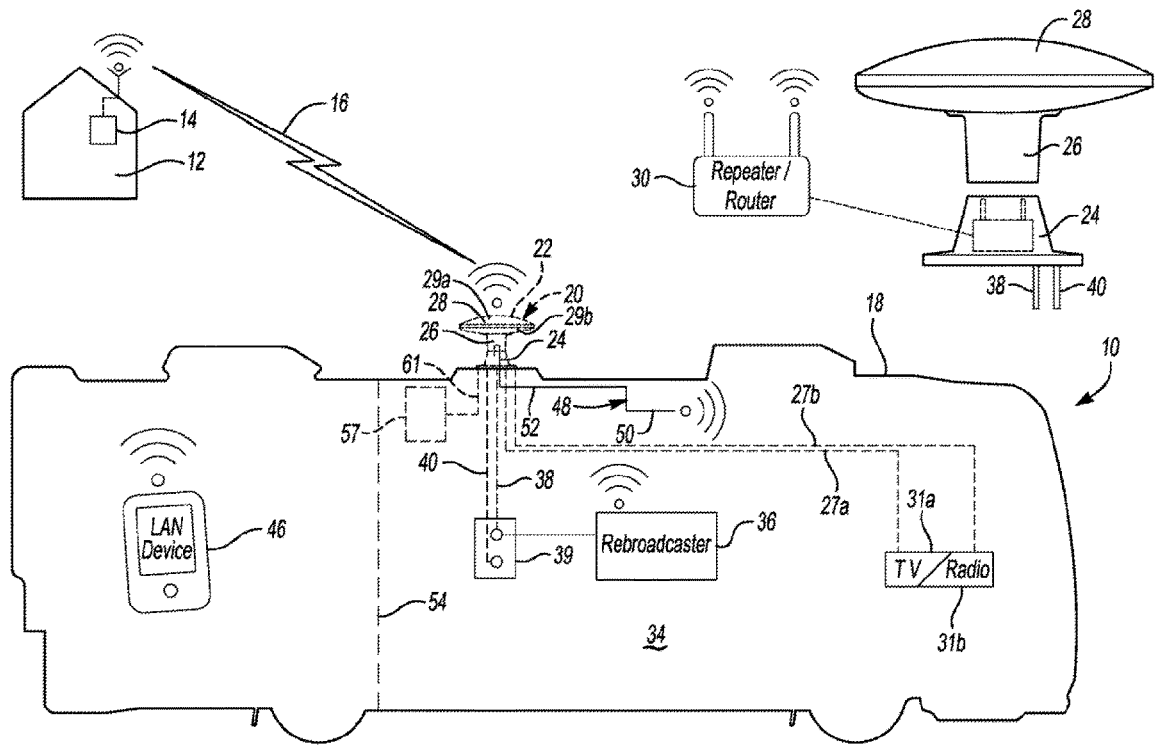

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 1-10 and 14-18 is confirmed.

Claims 11-13 are cancelled.

\* \* \* \* \*